(No Model.)

D. M. WESTON.
Centrifugal Machine.

No. 236,389.   Patented Jan. 4, 1881.

WITNESSES
Arthur Reynolds
V. D. Dearborn

INVENTOR
David M. Weston,
by Crosby Gregory
Attys

UNITED STATES PATENT OFFICE.

DAVID M. WESTON, OF BOSTON, MASSACHUSETTS.

CENTRIFUGAL MACHINE.

SPECIFICATION forming part of Letters Patent No. 236,389, dated January 4, 1881.

Application filed July 26, 1880. (No model.)

*To all whom it may concern:*

Be it known that I, DAVID M. WESTON, of Boston, county of Suffolk, State of Massachusetts, have invented an Improvement in Centrifugal Machines, of which the following description, in connection with the accompanying drawings, is a specification.

This invention relates to centrifugal machines; and it has for its object the combination, with the drum or basket, of a plow or scraper by which to automatically detach the sugar from the interior of the said drum or basket near its lower end and at its bottom, the said plow being shaped, substantially as herein shown, to aid in discharging the sugar or other material from the drum through a suitable outlet in its bottom.

In centrifugal machines as now chiefly employed in the manufacture of sugar, the latter, by centrifugal action, is impaled against the interior of the drum or basket, forming a thick and stiff wall which is detached by a spade in the hand of a workman.

In this my invention I have suitably supported independently of the drum, and outside of it, a plow or scraper, which, when it is desired to break down and remove the sugar wall, is turned into the drum, when the drum is rotated slowly in any proper way, preferably by an independently-driven shaft, so that that end of the plow almost in contact with the drum is made to act upon the said sugar wall, and as the drum is rotated breaks down and detaches the said sugar wall from the drum, the sugar being moved by the said plow toward the center of the machine and discharged at the usual bottom outlet.

My invention consists, essentially, in a centrifugal machine combined with a stationary plow or scraper to automatically break down and detach the sugar wall therefrom and force it toward the center of the drum, to be discharged through the bottom of the drum.

Figure 1:
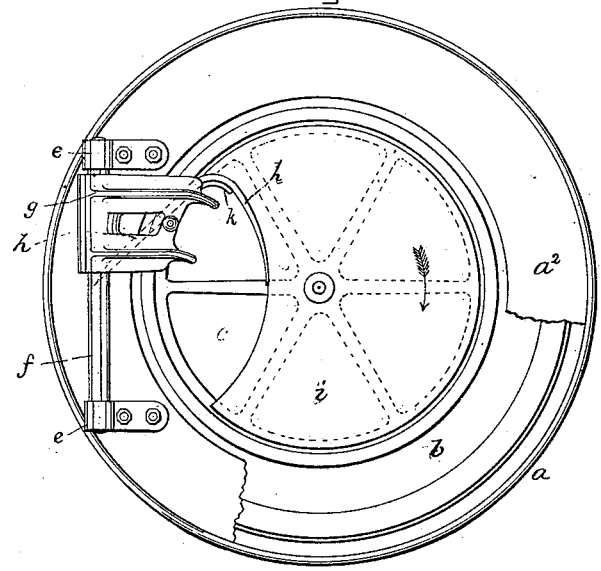
Figure 2:
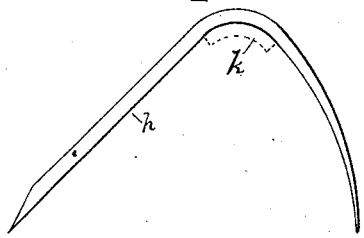
Figure 3:
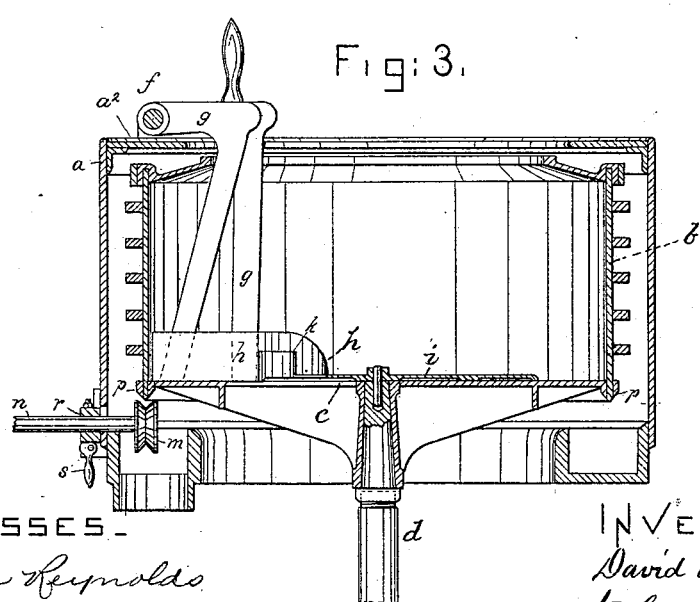

Figure 1 of the drawings is a plan view of a sufficient portion of a centrifugal machine to illustrate my invention, the casing being broken away at one side to show the drum or basket, the dotted lines showing the spider which carries the drum. Fig. 2 and Fig. 3 are sectional views of Fig. 1.

The casing $a$, its top plate, $a^2$, rotating drum $b$, provided with the bottom outlet, $c$, and the spindle $d$ are and may be all as usual. Upon this top plate, $a^2$, are secured ears or journals $e$ $e$ for the shaft or axle $f$, upon which the beam or arm $g$ carrying the plow $h$ is secured. The plow $h$, connected with the beam $g$, is so shaped and supported that one of its ends $m$ extends diagonally toward and rests very close to the inner lower side of the drum. That end of the plow nearest the center of the drum will preferably be curved, as shown, to act upon and force the detached or loosened sugar toward the center of the drum.

The bottom of the drum, with the exception of a third, or it may be a quarter, of it, is left entirely open; but above the bottom of the drum, and inside of it, is placed loosely a disk, $i$, pivoted at its center on the drum-spindle. This disk acts as a valve, and has at one side or edge an open space, (shown clearly in Fig. 1,) through which the contents of the drum may be discharged whenever the opening in the valve is not directly over the closed part of the bottom of the drum. This valve or disk has upon it a horn or projection, $k$, against which the curved rear end of the plow strikes when turned down into the drum and the drum is rotated. The plow holds the valve or disk in position as the drum is rotated, so that as the sugar wall is detached it will be swept or forced by the plow into the space or opening in the said valve or disk, and the sugar will immediately fall from the machine, if the small surface of the bottom of the drum, as before described, is not then under the opening in the said valve. The height of the acting edge of this plow may be varied to suit circumstances, as may also its angular presentation and shape.

During the time that the plow acts to detach the sugar wall from the drum the drum should be turned slowly. This it is preferred to do by driving-power independent of that which drives the machine when operating regularly. One simple way of actuating the drum is by means of a grooved friction-wheel, $m$, on a rotating shaft, $n$, driven by hand or from a suitable shaft forming no part of the centrifugal machine. This friction-wheel is constructed to fit a friction-ledge, $p$, placed about the bottom of the drum. The shaft $n$ is shown as held in a bearing, r, made adjustable by a hand-lever, s. This friction-wheel will rotate the drum slowly. In modern centrifugal machines of large size it is customary to employ two or more men at the same time to discharge the machine, this being necessary to save loss of time in the use of the machine, such loss being greater than the wages of the men.

In this apparatus but one man will be required to charge and discharge each machine, and the machine may be discharged quicker than by the old way, and the machine may be discharged while in motion.

I am aware that scrapers of different forms have been used to scrape the interior of the drum or basket while in operation; but I am not aware that a plow has ever been employed to break up and discharge the solid sugar wall left in the drum after discharging its liquid contents.

I claim—

1. In a centrifugal machine, the combination, with the rotating drum and casing, of the plow or scraper and its pivoted carrying-beam, whereby the plow may be turned up out from the drum or be turned down into the drum to automatically detach or break down and remove the sugar wall, substantially as described.

2. The combination, with the rotating drum, of a centrifugal machine and its bottom valve, as described, of a plow or scraper to detach the sugar wall from the interior of the drum, move it toward the center of the drum, and discharge it therefrom, substantially as described.

3. The rotating drum and the plow or scraper to detach the sugar wall from the interior of the drum, combined with means independent of the usual driving mechanism for the drum to rotate the drum slowly while the plow is in operation.

In testimony whereof I have signed my name to this specification in the presence of two subscribing witnesses.

DAVID M. WESTON.

Witnesses:
G. W. GREGORY,
N. E. C. WHITNEY.